Nov. 12, 1963    W. S. EAKINS    3,110,444
SPRAY DRYING PROCESS AND APPARATUS
Filed Dec. 6, 1960    2 Sheets-Sheet 1
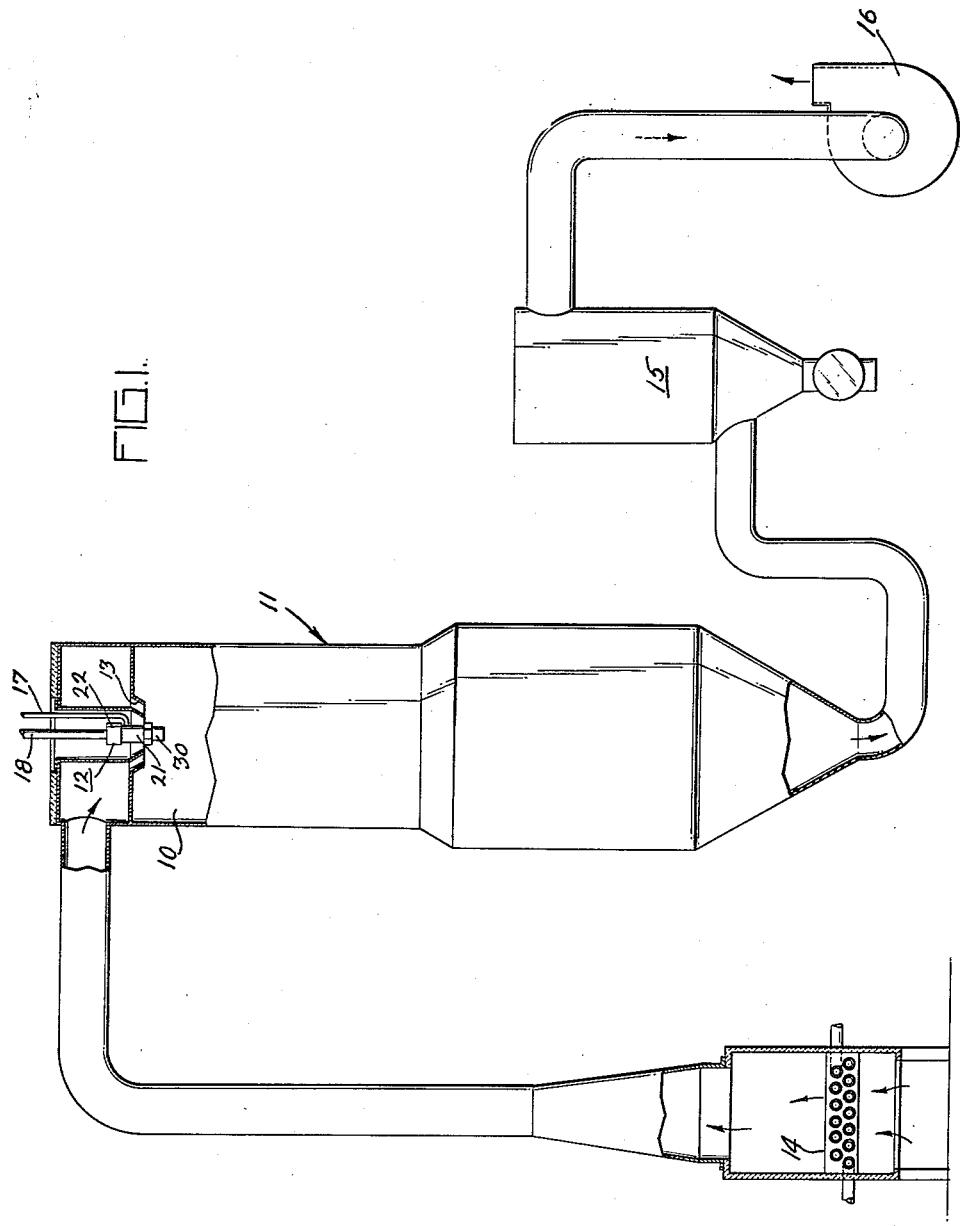
INVENTOR:
WILLIAM S. EAKINS
BY
Howson & Howson
ATTYS.

Nov. 12, 1963  W. S. EAKINS  3,110,444
SPRAY DRYING PROCESS AND APPARATUS
Filed Dec. 6, 1960  2 Sheets-Sheet 2
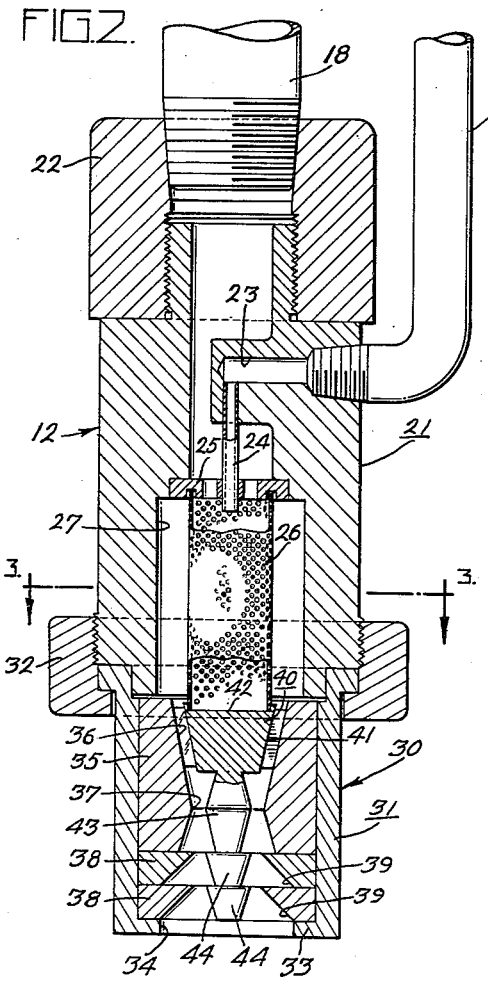
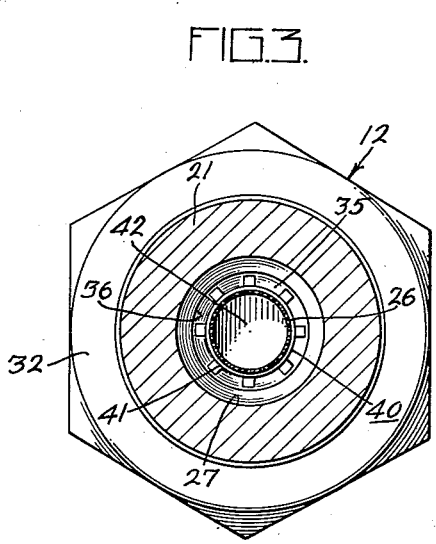
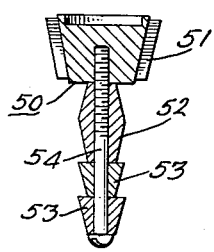
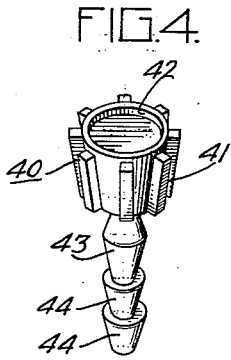
INVENTOR:
WILLIAM S. EAKINS
BY
Howson & Howson
ATTYS.

3,110,444
SPRAY DRYING PROCESS AND APPARATUS

William S. Eakins, Glen Cove, N.Y., assignor of one-half to J. S. & W. R. Eakins, Incorporated, Brooklyn, N.Y., a corporation of New York, and one-half to The Proctor-Silex Corporation, Philadelphia, Pa., a corporation of Connecticut Filed Dec. 6, 1960, Ser. No. 74,099
7 Claims. (Cl. 239—427)

This invention relates to new and useful improvements in spray drying apparatus and processes and more particularly to new and useful improvements and means for atomizing an extremely viscose slurry or the like and thereafter drying the same to produce a dried product which may be readily reconstituted.

This invention is particularly suitable for drying extremely viscose slurries having a solid content as high as 75% and a viscosity of 150,000 centipoises or more. Material of this type may include inorganic pigments for use in a manufacture of paint. Previously, material of this type was dried in the form of a filter cake on a tray or conveyor dryer to reduce the moisture content to the desired value and thereafter the filter cake was ground to the desired particle size in a grinding mill or other type of pulverizer. This procedure was necessary since, if material of this type was dried by a conventional spray dryer, a considerable amount of liquid had to be added to the filter cake to reduce the filter cake to a viscosity which would permit atomization in a conventional atomizing device; and the amount of steam, air and heat required to properly atomize and dry the material made a spray drying process commercially unfeasible.

With the foregoing in mind a primary object of the present invention is to provide a novel spray drying system wherein an extremely viscose material may be atomized and dried with a minimum amount of atomizing and drying merdium to produce a dry product which is equal or superior to the product produced by conventional methods.

Another object of the present invention is to provide a novel apparatus of the above type which may be readily adapted for spray drying a wide variety of products at a cost comparable to or below that of the cost of other spray drying and conventional drying processes.

A still further object of the present invention is to provide a novel spray drying nozzle through which an extremely high volume of material may pass and which will operate successfully without clogging and without showing undue signs of wear.

A still further object of the present invention is to provide a novel spray dryer nozzle wherein an atomizing fluid is mixed with the material to be atomized and which will operate at an extremely low ratio of atomizing fluid to material being atomized.

Still a further object of the present invention is to provide a novel spray drying system having the features and characteristics set forth above which is of relatively simplified construction, may be manufactured easily and cheaply, and is entirely efficient and effective in operation and use.

These and other objects of the present invention and the various features and details of the operation and construction thereof are hereinafter more fully set forth and described with reference to the accompanying drawings, in which:

FIG. 1 is a side elevational view partially in section of the spray drying system of the present invention;

FIG. 2 is an enlarged longitudinal sectional view through the spray nozzle of the present invention:

FIG. 3 is a transverse sectional view taken on line 3—3 of FIG. 2;

FIG. 4 is a perspective view of the core portion of the spray nozzle; and

FIG. 5 is a longitudinal sectional view of a modified form of the core for the spray nozzle.

The present invention provides a novel process and apparatus for spray drying extremely viscose materials to produce a dry powdered product. Various materials which may be readily spray dried according to the present invention are, for example, aqueous pastes in slurry form of various inorganic pigments such as lead chromate, zinc chromate, titanium dioxide, calcium carbonate, etc. In the production of paint pigments these slurries normally have a viscosity in the range of 40,000 to 150,000 centipoises and the viscosity may be as high as 200,000 centipoises. The solids content of these slurries may be as high as 75%. It has been found that the only limit in atomizing material so far as viscosity is concerned is the ability of the material to be pumped. If the material can be pumped into the nozzle, it can be atomized.

The above pastes have been dried in accordance with the present invention on a commercially competitive basis with the dried product being in the form of individual particles and easily dispersible agglomerates. The pastes have been atomized in the two fluid nozzle of the present invention with an extremely low ratio of atomizing fluid to dry product. In conventional two fluid nozzles the ratio of atomizing fluid to substance to be atomized is normally in the range of 1:1 up to 12:1 by weight with the lowest range usually being approximately 1.5:1. In the two fluid nozzle of the present invention this ratio may be as low as 0.075:1. Steam or air has been used as the atomizing fluid with the minimum atomizing fluid pressure being in the neighborhood of 40 lbs. per square inch. Heated air has been used as a drying medium with a maximum temperature of the air being that which will dry the product without raising the temperature of the product above the temperature at which the product is affected deleteriously.

Additionally starch, gelatine and syrup solutions are suitable for drying by the apparatus and process of the present invention with the solids content of these solutions being approximately 15 to 50%.

The following specific examples give the materials, operating conditions, and results of typical runs employing the apparatus and process of the present invention:

Example A

| | |
|---|---|
| Material treated | Lead chromate |
| Solids content of material treated (percent) | 47.5 |
| Viscosity of material treated (c.p.s.) | 80,000 |
| Rate of feed of material treated (lbs./hr.) | 993 |
| Pressure of material treated (p.s.i.g.) | 120 |
| Atomizing fluid | Steam |
| Rate of feed of atomizing fluid (lbs./hr.) | 86.5 |
| Pressure of atomizing fluid (p.s.i.g.) | 125 |
| Temperature of atomizing fluid (° F.) | 353 |
| Drying medium | Air |
| Inlet temperature of drying medium (° F.) | 1200 |
| Rate of flow of drying medium (c.f.m.) | 750 |
| Ratio feed to atomizing fluid (lbs./lb.) | 0.0875 |

Example B

| | |
|---|---|
| Material treated | Chromium oxide |
| Solids content of material treated (percent) | 72 |
| Viscosity of material treated (cps.) | 100,000 |
| Rate of feed of material treated (lbs./hr.) | 1370 |
| Pressure of material treated (p.s.i.g.) | 120 |
| Atomizing fluid | Steam |
| Rate of feed of atomizing fluid (lbs./hr.) | 86.5 |
| Pressure of atomizing fluid (p.s.i.g) | 125 |
| Temperature of atomizing fluid (° F.) | 353 |
| Drying medium | Air |
| Inlet temperature of drying medium (° F.) | 1350 |
| Rate of flow of drying medium (c.f.m.) | 750 |
| Ratio feed to atomizing fluid (lbs./lb.) | 0.0632 |

Example C

| | |
|---|---|
| Material treated | Zinc chromate |
| Solids content of material treated (percent) | 66 |
| Viscosity of material treated (c.p.s.) | 110,000 |
| Rate of feed of material treated (lbs./hr.) | 1025 |
| Pressure of material treated (p.s.i.g.) | 85 |
| Atomizing fluid | Air |
| Rate of feed of atomizing fluid (lbs./hr.) | 232 |
| Pressure of atomizing fluid (p.s.i.g.) | 90 |
| Temperature of atomizing fluid (° F.) | 70 |
| Drying medium | Air |
| Inlet temperature of drying medium (° F.) | 1000 |
| Rate of flow of drying medium (c.f.m.) | 750 |
| Ratio feed to atomizing fluid (lbs./lb.) | 0.226 |

Example D

| | |
|---|---|
| Material treated | Toluidine red toner |
| Solids content of material treated (percent) | 26 |
| Viscosity of material treated (c.p.s.) | 70,000 |
| Rate of feed of material treated (lbs./hr.) | 362 |
| Pressure of material treated (p.s.i.g.) | 120 |
| Atomizing fluid | Steam |
| Rate of feed of atomizing fluid (lbs./hr.) | 89 |
| Pressure of atomizing fluid (p.s.i.g.) | 125 |
| Temperature of atomizing fluid (° F.) | 353 |
| Drying medium | Air |
| Inlet temperature of drying medium (° F.) | 650 |
| Rate of flow of drying medium (c.f.m.) | 750 |
| Ratio feed to atomizing fluid (lbs./lb.) | 0.246 |

Example E

| | |
|---|---|
| Material treated | Calcium carbonate |
| Solids content of material treated (percent) | 51 |
| Viscosity of material treated (c.p.s.) | 100,000 |
| Rate of feed of material treated (lbs./hr.) | 512 |
| Pressure of material treated (p.s.i.g.) | 120 |
| Atomizing fluid | Steam |
| Rate of feed of atomizing fluid (lbs./hr.) | 86.5 |
| Pressure of atomizing fluid (p.s.i.g.) | 125 |
| Temperature of atomizing fluid (° F.) | 353 |
| Drying medium | Air |
| Inlet temperature of drying medium (° F.) | 900 |
| Rate of flow of drying medium (c.f.m.) | 750 |
| Ratio feed to atomizing fluid (lbs./lb.) | 0.169 |

Example F

| | |
|---|---|
| Material treated | Barium sulfate |
| Solids content of material treated (percent) | 68 |
| Viscosity of material treated (c.p.s.) | 120,000 |
| Rate of feed of material treated (lbs./hr.) | 642 |
| Pressure of material treated (p.s.i.g.) | 120 |
| Atomizing fluid | Steam |
| Rate of feed of atomizing fluid (lbs./hr.) | 86.5 |
| Pressure of atomizing fluid (p.s.i.g.) | 125 |
| Temperature of atomizing fluid (° F.) | 353 |
| Drying medium | Air |
| Inlet temperature of drying medium (° F.) | 1050 |
| Rate of flow of drying medium (c.f.m.) | 750 |
| Ratio feed to atomizing fluid (lbs./lb.) | 0.135 |

Example G

| | |
|---|---|
| Material treated | Bentonite clay |
| Solids content of material treated (percent) | 3.22 |
| Viscosity of material treated (c.p.s.) | 10,000 |
| Rate of feed of material treated (lbs./hr.) | 350 |
| Pressure of material treated (p.s.i.g.) | 120 |
| Atomizing fluid | Steam |
| Rate of feed of atomizing fluid (lbs./hr.) | 86.5 |
| Pressure of atomizing fluid (p.s.i.g.) | 125 |
| Temperature of atomizing fluid (° F.) | 353 |
| Drying medium | Air |
| Inlet temperature of drying medium (° F.) | 1200 |
| Rate of flow of drying medium (c.f.m.) | 450 |
| Ratio feed to atomizing fluid (lbs./lb.) | 0.248 |

The resulting product of these examples was a free flowing powder consisting of individual particles and agglomerates of particles which were suitable for the commercial purposes for which they were intended.

With reference to the accompanying drawings there is illustrated one form of apparatus which may be used to spray dry the material referred to above. The material is fed into a drying chamber 10 formed in a spray dryer 11 through a two fluid nozzle 12, more fully described hereinafter. Drying medium is caused to enter the drying chamber 10 through an inlet opening 13 surrounding the nozzle 12 with the drying medium being heated by a conventional heater 14. The drying medium and dried product may be exhausted from the bottom of the spray dryer and caused to enter a conventional collector 15. The collector 15 may be any suitable collector which may collect particles of the size produced by this process. In the drawings this is illustrated as a Mikro-pulsaire bag collector which is a conventional collector for collecting extremely small particles. If desired, the drying medium may be pulled through the system by means of an exhaust blower 16. Conduits are provided, as illustrated in the drawing, interconnecting the heater 14, the spray dryer 11, the bag collector 15 and the exhaust blower 16.

With reference to FIGS. 2, 3, and 4 of the drawings there is illustrated one form of a spray nozzle 12 made in accordance with the present invention. This spray nozzle is a two fluid type nozzle with the material to be dried being fed to the nozzle under pressure through an inlet pipe 17 and the atomizing fluid being fed under pressure to the nozzle through an inlet pipe 18.

The spray nozzle 12 comprises a hollow body portion 21 with means to admit the atomizing fluid and material to be atomized to the upper portion to the core of the hollow body 21, means to mix the atomizing fluid and material to be atomized within the core of the body portion 21, and means to discharge the atomizing fluid and material in the form of fine particles at the bottom of the body portion 21. As illustrated in FIG. 2, the atomizing fluid is admitted to the body portion 21 of the spray nozzle through the inlet pipe 18 which terminates within a cap 22, adjacent the upper end of the body portion 21, with the cap 22 being threadedly secured to the upper end of the body portion 21. The inlet pipe 17 for the material to be atomized is threaded into one side of the body portion 21 and is in fluid communication with a passageway 23 formed within the hollow body portion 21 of the spray nozzle. A small tube 24 extends downwardly from the passageway 23 through a perforated disc 25 extending transversely of the core of the body portion 21 and the tube 24 terminates within a cylindrical screen 26. Both the atomizing fluid and material to be atomized are discharged at high velocity within the cylindrical screen 26 and the atomizing fluid and material to be atomized are thoroughly mixed within the screen. The screen 26 preferably has extremely small openings therein, for example, the screen may be in the order of a 100 to 200 mesh and the atomizing fluid and material to be atomized pass outwardly through the openings in the screen into a chamber 27 formed in the lower end of the body portion 21. With this construction the screen 26 serves to thoroughly intermix the atomizing fluid and material to be atomized and filter any foreign matter out of the material to be atomized to prevent the foreign matter from being discharged through the spray nozzle.

In accordance with the present invention an atomizing head, designated generally as 30, is secured to the lower end of the body portion 21. This atomizing head 30 may comprise for example, a cylindrical casing 31 secured to the base of the body portion 21 for example by means of a retaining ring 32 with a shoulder 33 being provided at the bottom of the case 31 and defining at the lower end of the casing 31 a discharge orifice 34. A plurality of atomizing rings are positioned within the casing 31 coaxial with the discharge orifice 34 with the upper ring 35 being generally cylindrically shaped and having a central opening 36 extending therethrough. The central opening is of generally venturi shape with a restricted throat portion 37 being provided within the venturi 36. Immediately beneath the ring 35 is a pair of shorter rings 38, 38 each having a frusto-conical opening 39 extending therethrough coaxial with the venturi 36. The restricted portion of the frusto-conical opening 39 of each ring 38 is adjacent the upper end of the ring. This provides a central opening extending through the atomizing head 30 having a restricted venturi at the upper end thereof and a plurality of sharp shoulders positioned beneath the venturi defined by the upper ends of the frusto-conical openings 39 of the rings 38. In the illustrated embodiment of the present invention two rings 38 have been shown and it has been found that the nozzle operates best over a wide range with two such rings. However, it will be understood that more or less rings may be used depending upon the specific type of material to be atomized.

In the illustrated embodiment of the present invention a central core 40 is provided extending through the central opening of the atomizing head 30 with the core specifically designed to provide a particular form of passageway through the central opening. The central core 40 is formed for example as illustrated in FIG. 4 of the drawings having an upper spider portion 41 which fits within the upper portion of the venturi of the ring 35 to position the core coaxial with the rings 35, and 38 and form a plurality of passageways extending from the chamber 27 to the central opening in the atomizing head. Additionally the spider portion 41 has a recess 42 in the upper portion thereof which receives and supports the screen 26.

Positioned beneath the spider 41 and formed integrally therewith is a double conical section 43 having its widest point at substantially the mid-point thereof and tapering toward its outer ends. Immediately beneath the double conical section 43 is a pair of frusto-conical segments 44, 44 having their widest portion at their upper end and tapering downwardly toward the bottom of the core 40. The sections 43 and 44 are so dimensioned that when the core is positioned within the ring 35 the widest section of the double conical portion 43 is at the throat 37 of the venturi 36 and the upper shoulder is formed by the frusto-conical segments 44, 44 are directly opposite the upper shoulders of the frusto-conical rings 38, 38. This construction provides three restricted coaxial annular openings between the core 40 and the rings 35, 38 and 38. For a proper operation of the atomizing head each of these annular openings should have substantially the same internal and external diameters and have the same cross-sectional area. It has been determined that the ideal clearance between the widest portion of the double conical section 43 and the venturi throat 37 is in the neighborhood of 1/32 of an inch and this same ideal clearance exists between the widest portions of the frusto-conical sections 44, 44 of the core and the narrowest portion of the frusto-conical openings 39, 39 of the ring 38, 38. This atomizing head will operate properly giving good atomization for an extended period of time without clogging and without showing signs of undue wear when these clearances preferably are $\frac{1}{32}$ of an inch and also will operate adequately when these clearances are between approximately $\frac{1}{64}$ of an inch and $\frac{3}{32}$ of an inch. Where no core is used in the nozzle the throat clearance may be as great as $\frac{1}{4}$ of an inch. Beyond these dimensions the atomizing head does not operate with complete satisfaction for extended periods of time.

FIG. 5 illustrates a modified form of core 50 which may be used in the atomizing head 30. This core 50 has a spider section 51, a double conical section 52 and a pair of frusto-conical sections 53, 53 corresponding to the various sections of the above described core 40. Each of the sections of the core 50 are formed as separate individual elements and are held together, for example, by means of a bolt 54 as illustrated in the drawings.

During operation of the spray nozzle 12 the atomizing fluid and the material to be atomized are thoroughly mixed within the screen 26 and the chamber 27 and caused to pass at high velocity through the opening between the core and the rings 35, 38 and 38. During passage through the core the speed of the atomizing fluid and material to be atomized is increased upon reaching the throat of the venturi 37 and additional turbulence is provided to the stream of material at the succeeding restricted openings formed by the frusto-conical sections 44, 44 and the rings 38, 38. This combination of the venturi together with the turbulence causes a very fine atomization of the material fed to the spray nozzle with a minimum amount of atomizing fluid. As set forth above the preferred atomizing fluid is steam and for normal operation of the spray nozzle a minimum steam pressure of approximately 40 lbs. per square inch is required to properly atomize the fluid. Additionally the ratio of atomizing fluid to material to be atomized should be carefully controlled and may be maintained as low as 0.075 lb. of steam for each pound of material to be atomized.

With this construction the material to be atomized is discharged into the drying chamber 10 in the form of fine droplets and the stream of material discharged is immediately contacted by the drying medium entering the drying chamber through the opening 13. The product is dried in the drying chamber and thereafter collected.

From the foregoing it will be observed that the present invention provides a novel process and apparatus for spray drying material wherein an extremely viscose material may be atomized and dried with a minimum amount of atomizing and drying medium. It will also be observed that the present invention provides a novel spray nozzle through which an extremely high volume of material may pass and which will operate successfully without clogging and without showing undue signs of wear.

While particular embodiments of the present invention have been illustrated and described herein it is not intended to limit the invention to such a disclosure and changes and modifications may be incorporated and embodied therein within the scope of the following claims.

I claim:

1. A spray nozzle for atomizing slurries, aqueous emulsions and the like with an atomizing fluid comprising; an enclosed mixing chamber, means defining an inlet opening to said chamber for said material, means defining an inlet opening to said chamber for said atomizing fluid, means defining a restricted outlet passageway from said chamber, a core member extending centrally of said outlet passageway for substantially the full length thereof and terminating at the outlet end of said outlet passageway, the walls of said passageway adjacent said chamber converging inwardly toward said core and then diverging outwardly away from said core in a direction away from said chamber to form a restricted venturi throat in said passageway surrounding said core member, the walls of said passageway downstream from said venturi abruptly projecting inwardly into the path of travel of the material through said passageway to form at least one abrupt shoulder in said passageway, and said core member being abruptly enlarged adjacent said abrupt shoulder in said passageway to provide a shoulder surrounding said core in a position directly opposite the shoulder in said passageway.

2. Apparatus in accordance with claim 1 wherein the clearance between said walls of said passageway and said core at said venturi throat and the clearance between said walls of said passageway and said core at said shoulder is between approximately 1/64 of an inch and 1/4 of an inch.

3. Apparatus in accordance with claim 1 wherein a series of abrupt shoulders are provided in said passageway, said abrupt shoulders being formed by a series of annular rings positioned concentric with said passageway downstream of said restricted venturi throat, each of said rings having a central opening therein of frusto-conical shape diverging outwardly in a direction downstream of said passageway.

4. Apparatus in accordance with claim 1 wherein a foraminous screen is positioned within said enclosed mixing chamber surrounding the inlet openings to said chamber for said atomizing fluid and said material, said screen being intermediate said inlet openings and said outlet passageway.

5. A spray nozzle as set forth in claim 1 wherein the cross-sectional area of said passageway between said core and the walls of said passageway at the venturi throat is substantially equal to the cross-sectional area of said passageway between the core and the walls of said passageway at the shoulder on said core and the shoulder in said passageway.

6. A spray nozzle for atomizing slurries, aqueous emulsions and the like with an atomizing fluid comprising; an enclosed mixing chamber, means defining an inlet opening to said chamber for said material, means defining an inlet opening to said chamber for said atomizing fluid, means defining a restricted outlet passageway from said chamber, the walls of said passageway adjacent said chamber converging inwardly toward one another and then diverging outwardly away from one another in a direction away from said chamber to form a restricted venturi throat in said passageway, the walls of said passageway downstream from said venturi abruptly projecting inwardly into the path of travel of the material through said passageway to form at least one abrupt shoulder in said passageway, and a core member positioned centrally of said passageway and extending for substantially the full length thereof, said core member having its peripheral side walls thereof diverging outwardly in the direction of flow of material through said passageway to said restricted venturi throat and thereafter converging inwardly from said restricted venturi throat portion to said shoulder portion in said passageway, said core being abruptly enlarged adjacent said shoulder portion in said passageway to provide a shoulder on said core in a position directly opposite the shoulder in said passageway.

7. Apparatus in accordance with claim 6 wherein the clearance between said core and the walls of said passageway at said restricted venturi throat and the clearance between said core and the walls of said passageway at said shoulder is between approximately 1/64 of an inch and 3/32 of an inch.

References Cited in the file of this patent

UNITED STATES PATENTS

| | | |
|---|---|---|
| 517,247 | Somers | Mar. 27, 1894 |
| 1,012,436 | Ransome et al. | Dec. 19, 1911 |
| 1,241,069 | Whittaker | Sept. 25, 1917 |
| 1,425,196 | Grossenbacher | Aug. 8, 1922 |
| 1,427,910 | Quinn | Sept. 5, 1922 |
| 1,441,982 | Heylman et al. | Jan. 9, 1923 |
| 1,484,271 | Murdock | Feb. 19, 1924 |
| 1,535,702 | Walsh et al. | Apr. 28, 1925 |
| 1,826,776 | Gunther | Oct. 13, 1931 |
| 2,012,139 | Peabody | Aug. 20, 1935 |
| 2,201,080 | Clark | May 14, 1940 |